United States Patent
Song et al.

(10) Patent No.: US 10,225,238 B2
(45) Date of Patent: Mar. 5, 2019

(54) DATA SECURITY FOR CONTENT DELIVERY NETWORKS

(71) Applicant: Facebook, Inc., Menlo Park, CA (US)

(72) Inventors: Yee Jiun Song, San Bruno, CA (US); Wendy Tobagus, Cupertino, CA (US); Aravind Narayanan, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 170 days.

(21) Appl. No.: 15/096,059

(22) Filed: Apr. 11, 2016

(65) Prior Publication Data
US 2017/0295144 A1    Oct. 12, 2017

(51) Int. Cl.
| | |
|---|---|
| *H04L 29/06* | (2006.01) |
| *G06F 21/10* | (2013.01) |
| *H04L 9/08* | (2006.01) |
| *G06Q 50/00* | (2012.01) |

(52) U.S. Cl.
CPC .......... *H04L 63/0428* (2013.01); *G06F 21/10* (2013.01); *H04L 9/0861* (2013.01); *H04L 9/0891* (2013.01); *H04L 63/062* (2013.01); *G06Q 50/01* (2013.01); *H04L 2209/60* (2013.01)

(58) Field of Classification Search
None
See application file for complete search history.

(56) References Cited

U.S. PATENT DOCUMENTS

| | | | | |
|---|---|---|---|---|
| 7,472,422 | B1* | 12/2008 | Agbabian | H04L 41/06 726/25 |
| 7,493,499 | B1* | 2/2009 | Deaver | G06F 17/30864 713/193 |
| 8,613,083 | B1* | 12/2013 | Njemanze | H04L 63/1416 709/223 |
| 9,286,240 | B1* | 3/2016 | Kuzmenko | G06F 21/6218 |
| 9,572,995 | B2* | 2/2017 | Kalidindi | H04N 21/2225 |
| 2006/0259589 | A1* | 11/2006 | Lerman | G06F 17/30017 709/219 |
| 2011/0238985 | A1* | 9/2011 | Sovio | H04N 21/2347 713/168 |
| 2012/0017087 | A1* | 1/2012 | Coppola | H04L 63/0428 713/171 |
| 2012/0204032 | A1* | 8/2012 | Wilkins | H04L 9/006 713/170 |

(Continued)

*Primary Examiner* — Farid Homayounmehr
*Assistant Examiner* — Olanrewaju J. Bucknor
(74) *Attorney, Agent, or Firm* — FisherBroyles, LLP

(57) ABSTRACT

Various embodiments implement a secure content distribution architecture involving a content delivery network (CDN). A web server system can encrypt a content file and store the encrypted content file in an origin data center. The web server system can store a decryption key for decrypting the content file. The CDN can fetch the encrypted content file after the content file is first requested by the CDN from the origin cache system. When a client device requests access to a website supported by the web server system, the web server system can provide a blueprint of a page of the website, a link to the content file in the CDN, and the decryption key for decrypting the content file. The client device can then request the encrypted content file from the CDN and utilize the decryption key to decrypt the encrypted content file.

20 Claims, 8 Drawing Sheets

(56) References Cited

U.S. PATENT DOCUMENTS

| | | | |
|---|---|---|---|
| 2012/0216296 A1* | 8/2012 | Kidron | G06F 17/30867 726/28 |
| 2013/0191494 A1* | 7/2013 | Sidhu | H04L 67/34 709/217 |
| 2014/0033074 A1* | 1/2014 | Thibaux | G06F 17/30867 715/753 |
| 2014/0189776 A1* | 7/2014 | Diehl | H04L 41/145 726/1 |
| 2014/0275807 A1* | 9/2014 | Redei | A61B 5/0022 600/300 |
| 2015/0046714 A1* | 2/2015 | Knox | H04L 9/0833 713/171 |
| 2015/0143119 A1* | 5/2015 | Matsunaga | H04L 63/061 713/168 |
| 2015/0180931 A1* | 6/2015 | Marr | H04L 65/607 713/165 |
| 2016/0006697 A1* | 1/2016 | Joglekar | H04L 63/20 713/152 |
| 2016/0129883 A1* | 5/2016 | Penilla | B60R 25/305 348/148 |
| 2017/0005790 A1* | 1/2017 | Brockmann | H04L 9/08 |

* cited by examiner

DATA SECURITY FOR CONTENT DELIVERY NETWORKS

BACKGROUND

Various websites rely on a content delivery network (CDN) to facilitate distribution of media files to the website's viewers. A CDN is a system of distributed servers forming a computer network that delivers cached content objects (e.g., media files or other content files) to an end-user device based on the geographic locations of the end-user device, the origin of the content objects, and/or a content delivery server. In a typical architecture, a web server system for a website can store the blueprints (e.g., formatted in a markup language) of pages of the website. For example, a blueprint of a webpage can be specified as a hypertext markup language (HTML) page. A blueprint specifies how an end-user device renders the corresponding page of the blueprint. The blueprint can specify links to one or more content objects for an end-user device to fetch from a CDN in order to render the page. The blueprint can specify where to render the content objects relative to other content of the page.

Because of the distributed manner of a CDN and because a content delivery server may be managed by a third-party entity different from the entity that manages a web server system, a malicious computing system may be able to access some of the content objects in the CDN without the web server system's approval. In one example, a web server system is part of a social networking system and a CDN can cache/store the photos and videos of the social networking system for end-user devices. In this example, a malicious computing system may be able to retrieve the photos and videos without being detected, and reconstruct a shadow social graph based on image recognition of the photos.

Figure 1:
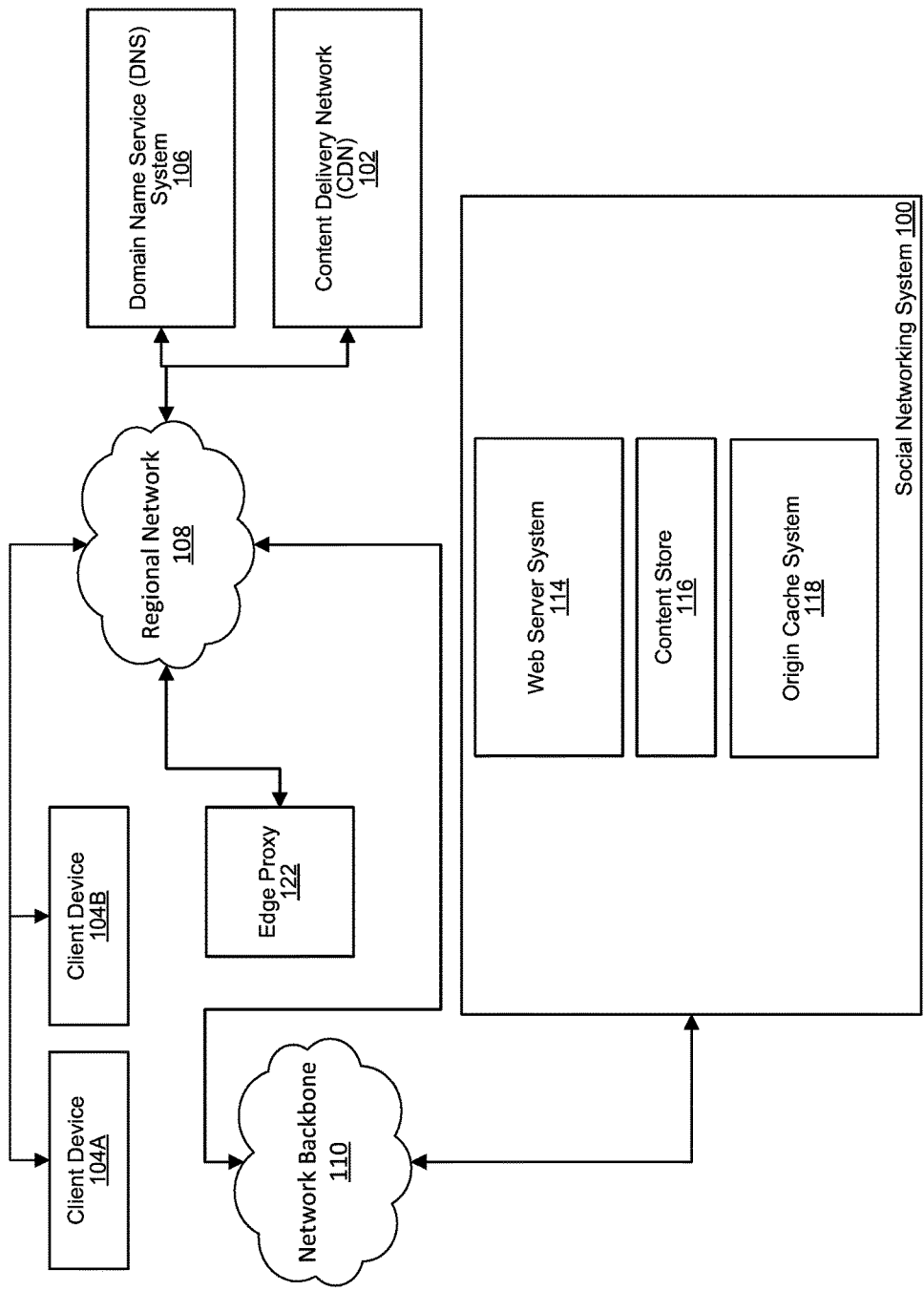
FIG. 1 is a block diagram illustrating a network environment of a social networking system and a CDN, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Some embodiments are directed at encrypting content in a CDN. To prevent a malicious computer system or entity from accessing the CDN and analyzing content objects in the CDN, various embodiments implement a secure content distribution architecture. The secure content distribution architecture utilizes a secure connection between a web server system (e.g., a web server system of a social networking system) and an end-user device to communicate one or more cryptographic keys used to decrypt one or more content objects in the CDN. The web server system can generate an encryption key to encrypt content in an origin cache system associated with the web server system. The cryptographic key can be (e.g., in the case of symmetric encryption) or can correspond to (e.g., in the case of asymmetric encryption) the encryption key used to encrypt content in the origin cache system. The CDN can copy over one or more content objects from the origin cache system when each content object is first requested at the CDN. A CDN can populate its storage space with one or more encrypted content objects requested from the origin cache system. The content object can be encrypted in response to storing the content object in the origin cache system or in response to a content request to send the content object to the CDN.

In one example, responsive to a request from an end-user device, the web server system can establish a secure connection to communicate with the end-user device. The web server system can provide a blueprint of a page for the end-user device to render. As part of or together with the blueprint, the web server system can provide a CDN hostname and one or more links to one or more content objects of the page. The web server system can also provide (e.g., as part of the blueprint or separately) a key dictionary of decryption keys to the end-user device. The key dictionary can be a table with containing associated pairs of content object links and decryption keys. Once the end-user device collects (e.g., by accessing a provided URL containing the CDN hostname and a content object link) an encrypted content object from the CDN, the end-user device can decrypt the content object utilizing the decryption key provided from the web server system via the secure connection. The end-user device then renders the page, including the decrypted content object, according to the blueprint of the page.

In various embodiments, the secure content distribution architecture adds an extra layer of security to protect network edge machines, including CDNs. Various embodiments protect against an untrusted third-party CDN, edge cache system, and/or network appliance. The layer of security prevents, for example a malicious computer system from running image recognition on photos or videos of a social networking system to build a shadow social graph. Various embodiments further obfuscate metadata associated with the CDN to protect against derivation of sensitive/private data (e.g., unique identifiers for the content object or a requesting user account) from the metadata.

Turning now to the figures, FIG. 1 is a block diagram illustrating a network environment of a social networking system 100 and a CDN 102, in accordance with various embodiments. The network environment includes at least the social networking system 100, the CDN 102, one or more client devices (e.g., a client device 104A and a client device 104B, collectively as the "client devices 104"), a domain name service (DNS) system 106, or any combination thereof. The client devices 104 can be end-user devices associated with member accounts of the social networking system 100. In the illustrated example, the client devices 104 are connected via a regional network 108. The DNS system 106 can service devices within the regional network 108. The CDN 102 can also service devices within the regional network 108. The regional network 108 can be connected to the social networking system 100 via at least a network backbone 110. For example the network backbone 110 can be provided by a network service provider (NSP) coupling one or more Internet service provider (ISP) networks servicing one or more regional networks (e.g., the regional network 108).

The social networking system 100 can include at least a web server system 114 and an origin cache system 118 (e.g., in an origin datacenter). The web server system 114 is configured to communicate with the client devices 104, including providing webpages and content objects (e.g., user-generated content object or resource packages) associated with an application service (e.g., a social networking service, a media content service, a messaging service, an advertisement service, or any combination thereof) of the social networking system 100. A user-generated content object can include an image and/or a video. A resource package can include one or more client-side scripts or executables (e.g., JavaScript), presentation style configuration files, page formatting blueprints (e.g., formatted in markup language), or any combination thereof. The origin cache system 118 stores content objects that may be presented as part of a page provided by the web server system 114. In various embodiments, the social networking system 100 can enable the CDN 102 to cache the content objects. In turn, the CDN 102 can locally serve the content objects to computing devices in the regional network 108.

In some embodiments, the web server system 114 can include an edge proxy 122 in a geographical region closer to the client devices 104. The edge proxy 122 can be an edge point of presence (PoP). For example, the edge proxy 122 can be within the regional network 108. The edge proxy can be a network proxy for the web server system 114.

In some examples, the social networking system 100 receives user-generated content from the client devices 104. The social networking system 100 can store and track the user-generated content as a content object (e.g., in a content store 116). The social networking system 100 can also receive developer-generated content (e.g., a resource package) as a content object. The social networking system 100 can generate an encryption key to associate with the content object. The social networking system 100 can store a decryption key corresponding to the encryption key as an object attribute of the content object. The social networking system 100 can encrypt the content object with the encryption key. In some embodiments, the social networking system 100 stores a copy of the encrypted content object in the origin cache system 118. In some embodiments, the social networking system 100 stores and unencrypted copy of the content object in the origin cache system 118. The origin cache system 118 can then encrypt the content object in response to receiving a content request at the origin cache system 118. The social networking system 100 can track decryption keys corresponding to these encryption keys for the content objects. In some embodiments, a decryption key is the encryption key. In some embodiments, each content object has a corresponding encryption key and therefore a corresponding decryption key. In some embodiments, a group of content objects share a corresponding encryption key and therefore a corresponding decryption key.

In one example, the client device 104A requests to access the social networking system 100 over a secure connection. In response to the request from the client device 104A, the web server system 114 can provide a page to present to the client device 104A. In various embodiments, the web server system 114 provides a blueprint (e.g., coded in a markup language) of a presentation page (e.g., a webpage) to the client device 104A. The web server system 114 can include a uniform resource locator (URL) associated with the CDN 102 in the blueprint. The blueprint can include one or more content object links associated with one or more content objects of the social networking system 100 that are part of the presentation page. The content object links can include a content object identifier for tracking the content object in the social networking system 100, a deterministic hash of the content object identifier, or a randomly generated string. In some embodiments, the origin cache system 118 stores a mapping of the content object links to corresponding content object identifiers. In some embodiments, the origin cache system 118 stores a mapping of a hash key used to calculate the deterministic hash to the corresponding content object identifier.

An application (e.g., a browser application or a social network specific application) running on the client device 104A can render the presentation page based on the blueprint and content objects retrieved from the CDN 102. For example, the application can request a content object listed in the blueprint. The blueprint provides a URL associated with the CDN 102. The application can generate and send a content request specifying the URL to the DNS system 106. In turn, the DNS system 106 can identify a network address of the CDN 102 for the application to communicate with. Unlike communication with the web server system 114, communication with the CDN 102 can be via an unsecure channel (e.g., not encrypted). The CDN 102 can store encrypted content objects keyed according to the content object links such that each encrypted content object is accessible by providing a corresponding content object link. The content request to the CDN 102 can include a content object link from the blueprint. The CDN 102 can identify an encrypted content object associated with the content object identifier. The CDN 102 can then provide the encrypted content object to the client device 104A in response to the content request.

Upon receiving the encrypted content object, the application can decrypt the encrypted content object utilizing a decryption key specified in the blueprint. In various embodiments, because the blueprint is provided to the client device 104A over a secure channel, the decryption key is therefore also provided via a secure channel. This architecture enables cryptographic security in third-party content distribution systems that communicate with the client devices 104 over unsecure channels.

Social Networking System Overview

Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

A social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 2:
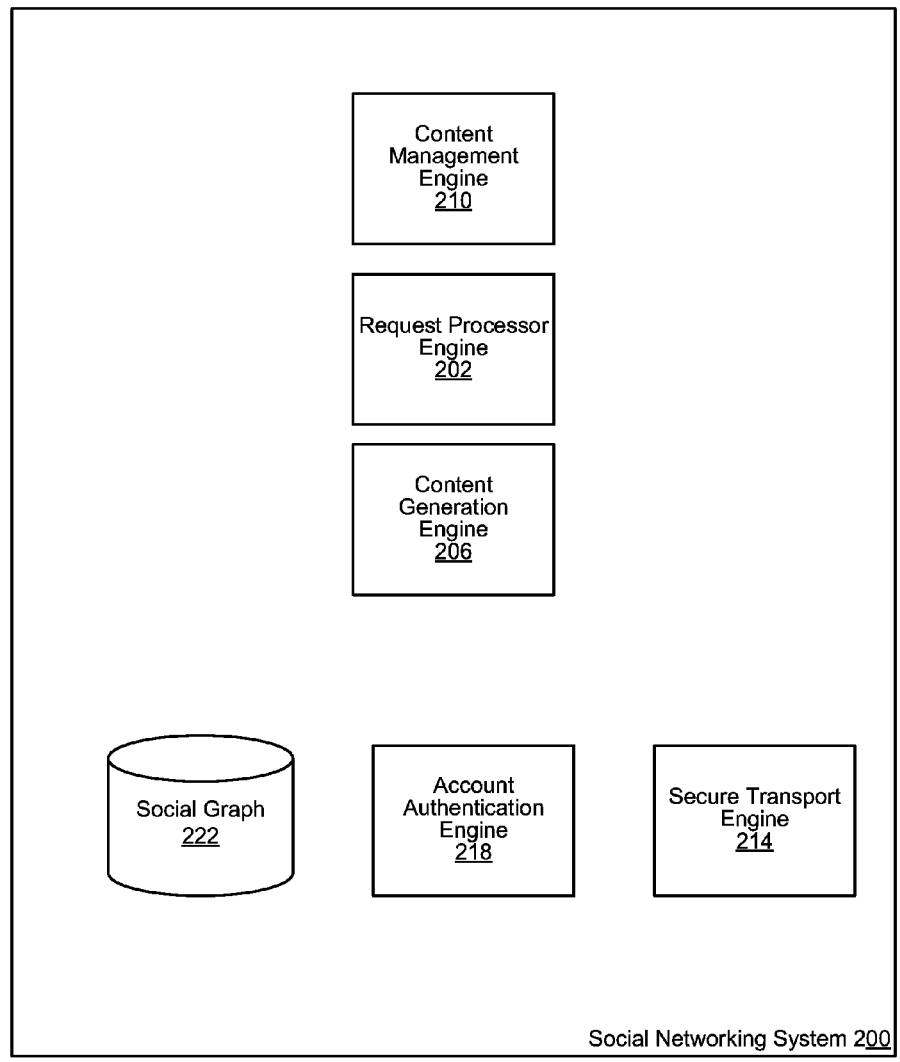
FIG. 2 a block diagram illustrating a social networking system implementing a secure content distribution architecture, in accordance with various embodiments.

FIG. 2 is a block diagram illustrating a social networking system 200 implementing a secure content distribution architecture, in accordance with various embodiments. The social networking system 200 includes a request processor engine 202, a content generation engine 206, and a content management engine 210. The request processor engine 202 communicates with client devices (e.g., the client devices 104 of FIG. 1). For example, the request processor engine 202 is configured to process hypertext transfer protocol (HTTP) requests from the client devices. In various embodiments, the request processor engine 202 can establish a HTTP secure (HTTPS) channel with a client device. A HTTPS channel is a secure communication channel over a computer network that utilizes HTTP to communicate and that encrypts/decrypts data over the secure communication channel according to a secure transport layer (e.g., the transport layer security (TLS) or the secure sockets layer (SSL)) protocol. For example, the request processor engine 202 can rely on a secure transport engine 214 to establish a secure connection. The secure transport engine 214 can generate and exchange cryptographic parameters with the client device to ensure that further communications between the client device and the social networking system 200 within the same browser session are encrypted.

After a secure connection is established between the social networking system 200 and the client device, the request processor engine 202 can provide a login page to the client device to demand an account login and to authenticate a user account associated with the client device. The request processor engine 202 can rely on an account authentication engine 218 to authenticate the login parameters provided by the client device. Upon authentication of the login parameters, the client device can generate requests to access to one or more application services of the social networking system 200. The request processor engine 202 can process those requests.

Once the secure connection is established and the user account is authenticated, the client device can request services and content from one or more application services of the social networking system 200. For example, the content generation engine 206 can be one of the application services. The content generation engine 206 dynamically generates content to present to the client device based on the state of a social graph 222 of the social networking system and account configurations (e.g., an account profile) associated with the user account of the client device.

In some embodiments, the content generation engine 206 can dynamically generate content (e.g., a newsfeed page) for the web server system to distribute in response to the web server system receiving a website request. In other examples, the web server system can provide static content upon request.

The content generation engine 206 can dynamically generate a blueprint of a page to send to the client device. A browser application of the client device can render the dynamically generated content according to the blueprint. For example, the blueprint may be formatted in the markup language (e.g., a hypertext markup language). The dynamically generated content can include references to other content objects. (e.g., resource packages and/or user-generated content). The social networking system 200 can include a content management engine 210. The content management engine 210 manages one or more content objects and object attributes/metadata (e.g., creation time, creation source, version, content object identifier, etc.) associated with the content objects. The references can be in the form of uniform resource locators (URLs). For example, each URL can include a host name and a content object link. In some embodiments, the content object reference provided with the blueprint is a content object identifier corresponding to a content object managed by the content management engine 210. In some embodiments, the content object link provided with the blueprint is a hash of the content object identifier.

In various embodiments, by referencing the content objects according to a hash value of the content object identifier in the blueprint, the social networking system 200 obfuscate metadata associated with the content object such that even if a third-party malicious entity is able to collect the content object, is unable to make contextual connection with the content object and a user account.

The content management engine 210 can store the content objects and their object attributes in an origin cache system (e.g., the origin cache system 118). The content management engine 210 can manage the origin cache system. The content management engine 210 can generate an encryption key for the content object. The content management engine 210 can generate the encryption key and the corresponding decryption key in response to creating the content object in the social networking system.

In some embodiments, the content management engine 210 also generates a content object link to the content object in response to the creation of the content object. In one example, the content object link is a hash of the content object identifier. The content management engine 210 can hash a content object identifier according to a hash function and/or hash key. The content management engine 210 can store the hash key as an object attribute of the content object in the origin cache system. In some embodiments, the content object link is randomly generated and maintained as an object attribute of the content object in the origin cache system.

The content management engine 210 can associate the decryption key corresponding to the encryption key with the content object link for the content object. The association can be stored in the origin cache system and/or the web server system. In some embodiments, the encryption key is the decryption key. For example, the social networking system can store the decryption key as an object attribute of the content object in a content store maintained by the origin cache system and/or the web server system.

The content management engine 210 can store the content object in a content store and/or the origin cache system for propagation into a CDN. The content store can maintain one or more attributes or metadata associated with the content object. In some embodiments, the web server system encrypts the content object before storing the encrypted content object in the origin cache system. In some embodiments, the web server system stores an unencrypted content object in the origin cache system, and relies on the origin cache system to encrypt utilizing the encryption key prior to propagating the encrypted content object to the CDN.

In various embodiments, the request processor engine 202, the content generation engine 206, the content management engine 210, the secure transport engine 214, the account authentication engine 218, or any combination thereof, is part of a web server system (e.g., the web server system 114) of the social networking system 200. In some embodiments, the content store is solely implemented in the origin cache system. In some embodiments, a content store is also implemented in the web server system.

Figure 3:
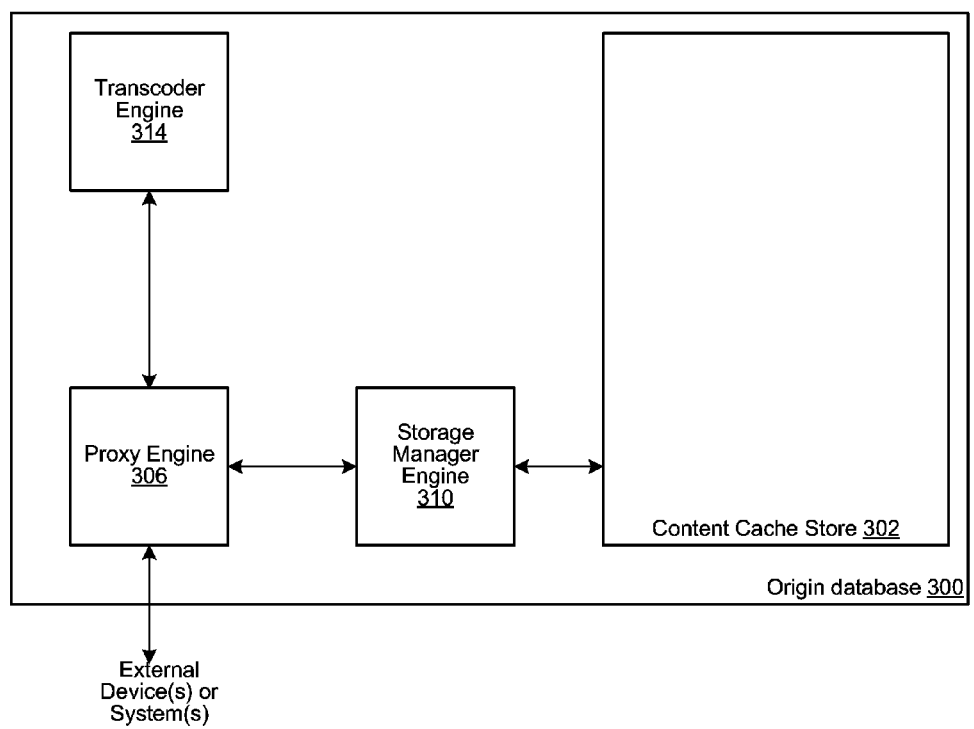
FIG. 3 is a block diagram of an origin cache system of a social networking system, in accordance with various embodiments

FIG. 3 is a block diagram of an origin cache system 300 of a social networking system (e.g., the social networking system 100 and/or the social networking system 200), in accordance with various embodiments. The origin cache system 300 can include a content cache store 302, a proxy engine 306, a storage manager engine 310, a transcoder engine 314, or any combination thereof.

In some embodiments, the proxy engine 306 is implemented by one or more computer servers to serve as a front-end request processing system. In some embodiments, the storage manager engine 310 is implemented by one or more computer servers to serve as storage operation load-balancer. The storage manager engine 310 can manage read and write operations to the content cache store 302. The proxy engine 306 can process write requests from the social networking system. For example, the proxy engine 306 can receive a content object associated with a content object link from the social networking system. The proxy engine 306 can request the storage manager engine 310 to store the content object in the content cache store 302.

The proxy engine 306 can process content requests from external computing devices, including for example, a CDN. For example, the proxy engine 306 can receive, from a CDN, a content request specifying the content object link to a content object. In some embodiments, the content object link can be an obfuscated version of a content object identify used to track the content object in the social networking system. In these embodiments, the proxy engine 306 can decode/decipher the content object link to determine an original content object identifier associated with the content object. The proxy engine 306 can retrieve one or more content objects responsive to one or more content requests utilizing the original content object identifier. In some embodiments, a content object link is a content object identifier used to track the content object in the social networking system.

In some embodiments, when the web server system stores content objects in the origin cache system, the content objects are unencrypted. In these embodiments, the proxy engine 306 can encrypt the requested content object in response to a content request from the CDN. The proxy engine 306 can encrypt the requested content object utilizing an encryption key (e.g., stored as an object attribute) associated with the content object in the content cache store 302.

The proxy engine 306 can generate a response message for the content request. The response message can include the encrypted content object. In some embodiments, the response message is transcoded for streaming. For example, the proxy engine 306 can utilize the transcoder engine 314 to transcode the response message before and/or after encryption the requested content object.

Functional/logic components (e.g., applications, engines, modules, and databases) associated with devices in the figures (e.g., the social networking system 100, the social networking system 200, the origin cache system 300, or any combination thereof) can be implemented as circuitry, firmware, software, or other functional instructions. For example, the functional/logic components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logic components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logic components may operate individually and independently of other functional/logic components. Some or all of the functional/logic components may be executed on the same host device or on separate devices. The separate devices can be coupled through one or more communication channels (e.g., wireless or wired channel) to coordinate their operations. Some or all of the functional/logic components may be combined as one component. A single functional/logic component may be divided into sub-components, each sub-component performing separate method step or method steps of the single component.

In some embodiments, at least some of the functional/logic components share access to a memory space. For example, one functional/logic component may access data accessed by or transformed by another functional/logic component. The functional/logic components may be considered "coupled" to one another if they share a physical connection or a virtual connection, directly or indirectly, allowing data accessed or modified by one functional/logic component to be accessed in another functional/logic component. In some embodiments, at least some of the functional/logic components can be upgraded or modified remotely (e.g., by reconfiguring executable instructions that implements a portion of the functional/logic components). The systems, engines, or devices described may include additional, fewer, or different functional/logic components for various applications.

Figure 4:
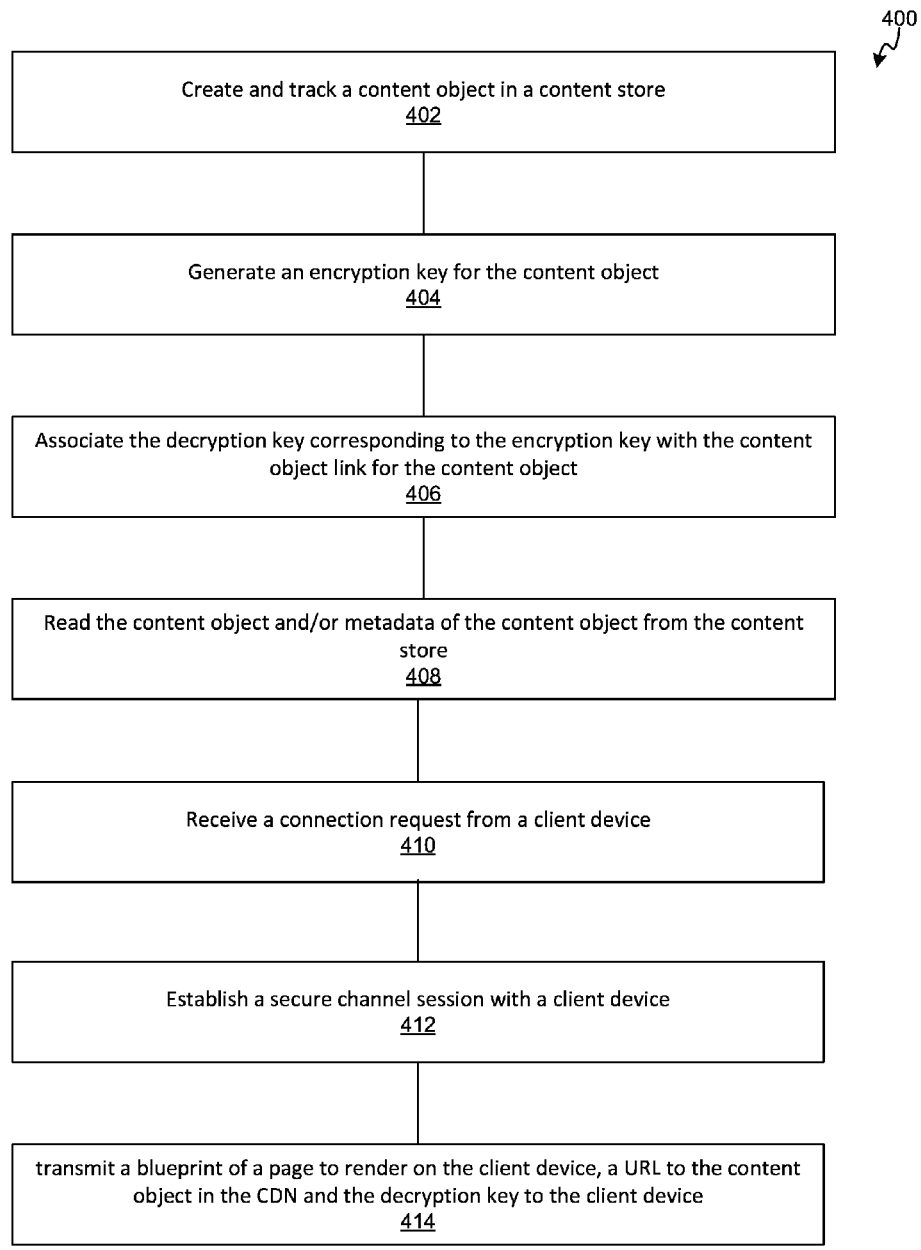
FIG. 4 is a flow diagram illustrating a method of operating a social networking system to implement a secure content distribution mechanism, in accordance with various embodiments.

FIG. 4 is a flow diagram illustrating a method 400 of operating a social networking system (e.g., the social networking system 100 or the social networking system 200) to implement a secure content distribution mechanism, in accordance with various embodiments. In some embodiments, the method 400 can be executed by a web server system (e.g., the web server system 114) of the social networking system. In block 402, the social networking system can create and track a content object in a content store. In some embodiments, the content store is a distributed content store independent of an origin cache system and a web server system. In some embodiments, the content store is maintained in the origin cache system (e.g., origin cache system 300 or the origin cache system 118). In some embodiments, the content store is maintained in the web server system with a copy of the content store maintained in the origin cache system. To track interactions between the content object and other social network entities in a social graph (e.g., the social graph 222), the social networking system can generate a content object identifier to associate with the content object. In one example, the social networking system can receive a content object uploaded from a client device. In this example, the content object includes the content object and one or more object attributes associated with the content object. In another example, the social networking system can receive a resource package of one or more client-side scripts/executables from a developer account. In this example, the content object includes the resource package and one or more object attributes associated with the resource package.

In block 404, the social networking system can generate an encryption key for the content object. In some embodiments, the encryption key and the corresponding decryption key are object-specific. In some embodiments, each encryption key and the corresponding decryption key are specific to a group of content objects.

The social networking system can generate the encryption key and the corresponding decryption key in response to creating the content object in the social networking system. In some embodiments, the social networking system can generate multiple encryption keys per content object. For example, one encryption key can be used to encrypt the content of the content object, and another encryption key can be used to encrypt the content object identifier, one or more object attributes of the content object, and/or metadata associated with the content object.

In some embodiments, the social networking system also generates a content object link to the content object in response to the creation of the content object. In some embodiments, the content object link is the content object identifier. In some embodiments, the social networking system obfuscates the content object link to be different from the content object identifier. In one example, the content object link is a hash of the content object identifier. The social networking system can hash a content object identifier according to a hash function and/or hash key. The social networking system can store the hash key as an object attribute of the content object. In some embodiments, the content object link is randomly generated and maintained as an object attribute of the content object.

In block 406, the social networking system can associate the decryption key corresponding to the encryption key with the content object link for the content object. In some embodiments, the encryption key is the decryption key. For example, the social networking system can store the decryption key as an object attribute of the content object in the content store.

In block 408, the origin cache system can read the content object and/or metadata (e.g., encryption and/or decryption key and/or hased object identifier) of the content object from the content store of the social networking system. These data can then be propagated into a CDN. For example, the content object can be stored in a content store in the origin cache system. The content store can maintain one or more attributes or metadata associated with the content object. In some embodiments, the web server system encrypts the content object before storing the encrypted content object in the origin cache system. In some embodiments, the web server system stores an unencrypted content object in the origin cache system, and relies on the origin cache system to encrypt utilizing the encryption key prior to propagating the encrypted content object to the CDN.

In block 410, the web server system can receive a connection request from a client device. In response to the connection request, the web server system can establish, in block 412, a secure channel session with a client device. In some embodiments, establishing the secure channel session includes establishing a first secure session between the social networking system and an edge proxy and a second secure session between the edge proxy and the client device. In some embodiments, the web server system also requests one or more login parameters from the client device and authenticate the login parameters provided by the client device to verify a user account of the social networking system associated with the client device.

After the secure channel session is established and/or the login parameters are authenticated, in block 414, the web server system can transmit a blueprint (e.g., formatted in markup language, such as HTML or XML) of a page to render on the client device, a URL to the content object in the CDN and the decryption key to the client device. The URL and/or the decryption key can be provided within the blueprint or as separate data structures. Transmitting the blueprint of the page can be in response to receiving a page request from the client device after establishing the secure channel session. The URL can include the content object link and a hostname of the CDN. In some embodiments, the web server system generates a key dictionary by at least accessing the content store to identify one or more decryption keys and one or more content object links that correspond to one or more content objects to include in the page. The web server system can transmit the key dictionary storing one or more decryption keys corresponding to one or more content object links provided in the blueprint. The content object links can respectively correspond to content objects in the origin cache system. In some embodiments, the decryption key can be passed along as part of a URL in the blueprint to the client device from the web server system. In response, the client device can strip the decryption key from the URL before issuing a call to retrieve the encrypted data at the stripped URL.

In some embodiments, the web server system can dynamically generate the page based on a current state of a social graph of the social networking system. When generating the page, the web server system can dynamically select one or more content objects, including the content object, for inclusion into the page.

In some embodiments, the encryption key associated with the content object can be rotated (e.g., according to a schedule). For example, the encryption key can be referred to as an "old encryption key." The social networking system can change the old encryption key to a new encryption key. The social networking system can identify a new decryption key corresponding to the new encryption key. The social networking system can generate a new content object link (e.g., different from the content object link generated previously) that corresponds to the content object. The social networking system can then update the new encryption key, the new decryption key and the new content object link as object attributes of the content object in the content store. These updates can be stored in the copy of the content store in the origin cache system.

Figure 5:
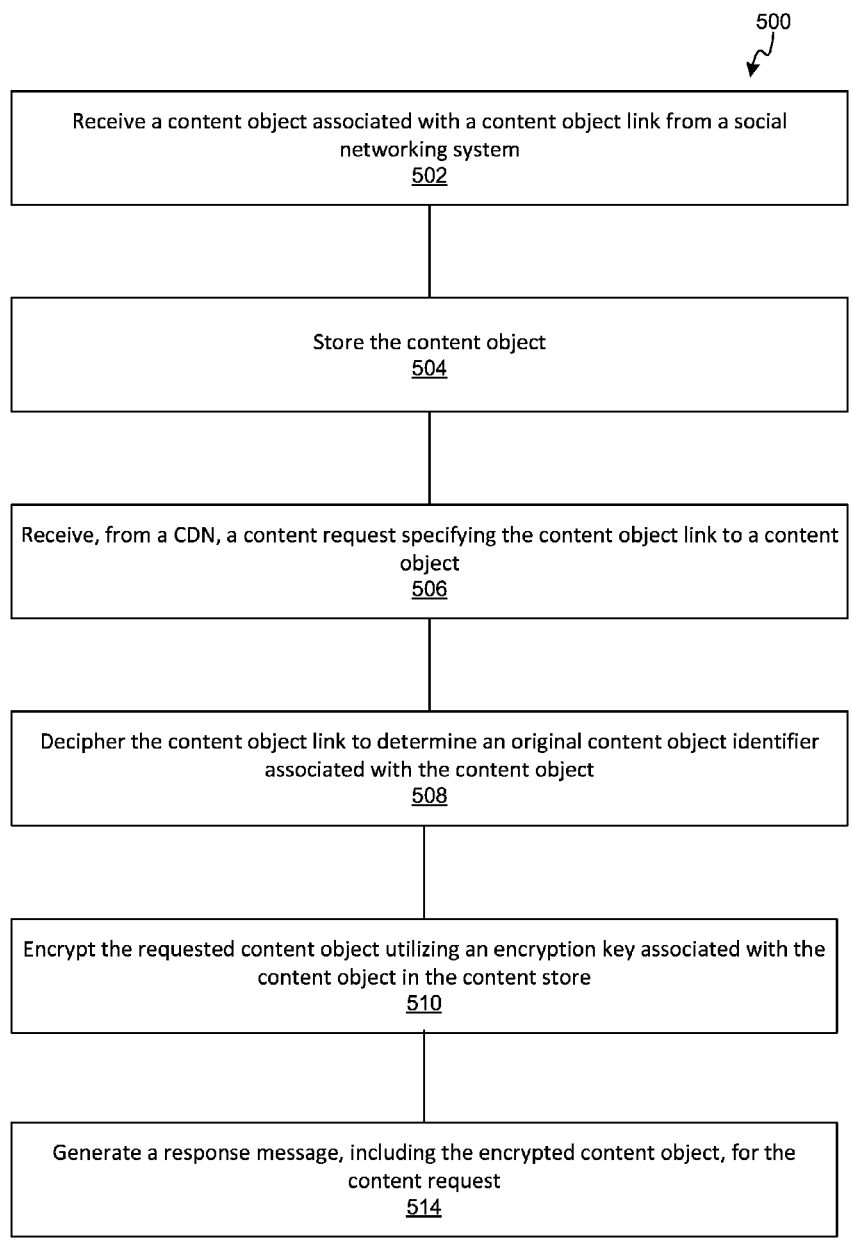
FIG. 5 is a flow diagram illustrating a method of operating a content store of a social networking system to implement a secure content distribution mechanism, in accordance with various embodiments.

FIG. 5 is a flow diagram illustrating a method 500 of operating a content store (e.g., the origin cache system 118 and/or the content store 116) of a social networking system (e.g., the social networking system 100 or the social networking system 200) to implement a secure content distribution mechanism, in accordance with various embodiments. In block 502, the content store can receive a content object associated with a content object link from a social networking system. In some embodiments, the content store is a general distributed content store accessible to various entities in the social networking system. In some embodiments, the content store is part of the origin cache system (e.g., a specific data storage system for propagating data to one or more CDNs). In some embodiments, the origin cache system is part of the content store.

In block 504, the content store can store the content object. In block 506, the content store can receive, from a CDN, a content request specifying the content object link to a content object. In some embodiments, in block 508, the content store deciphers the content object link to determine an original content object identifier associated with the content object. In these embodiments, the web server system of the social networking system generated the content object link to obfuscate the relationship between the content object identifier (e.g., used in the secure connection between client devices and the web server system) and the content object link (e.g., used in referencing content stored in the CDN). The content store can decipher the content object link to compute an original content object identifier associated with the content object in the content store and retrieve the content object responsive to content requests utilizing the original content object identifier. Content object identifiers can be used to track the content object in a social graph of the social networking system.

In some embodiments, when the web server system stores content objects in the content store, the content objects are unencrypted. In these embodiments, the content store can encrypt the requested content object in response to the content request from the CDN. In block 510, the content store can encrypt the requested content object utilizing an encryption key (e.g., stored as an object attribute) associated with the content object in the content store. For example, the content store can encrypt the requested content object utilizing a streaming encryption algorithm (e.g., Advanced Encryption Standard in Galois/Counter Mode (AES-GCM)).

In block 512, the content store can generate a response message for the content request. The response message can include the encrypted content object. In some embodiments, the response message is transcoded for streaming. The content store can transcode the response message before and/or after encryption the requested content object.

Figure 6:
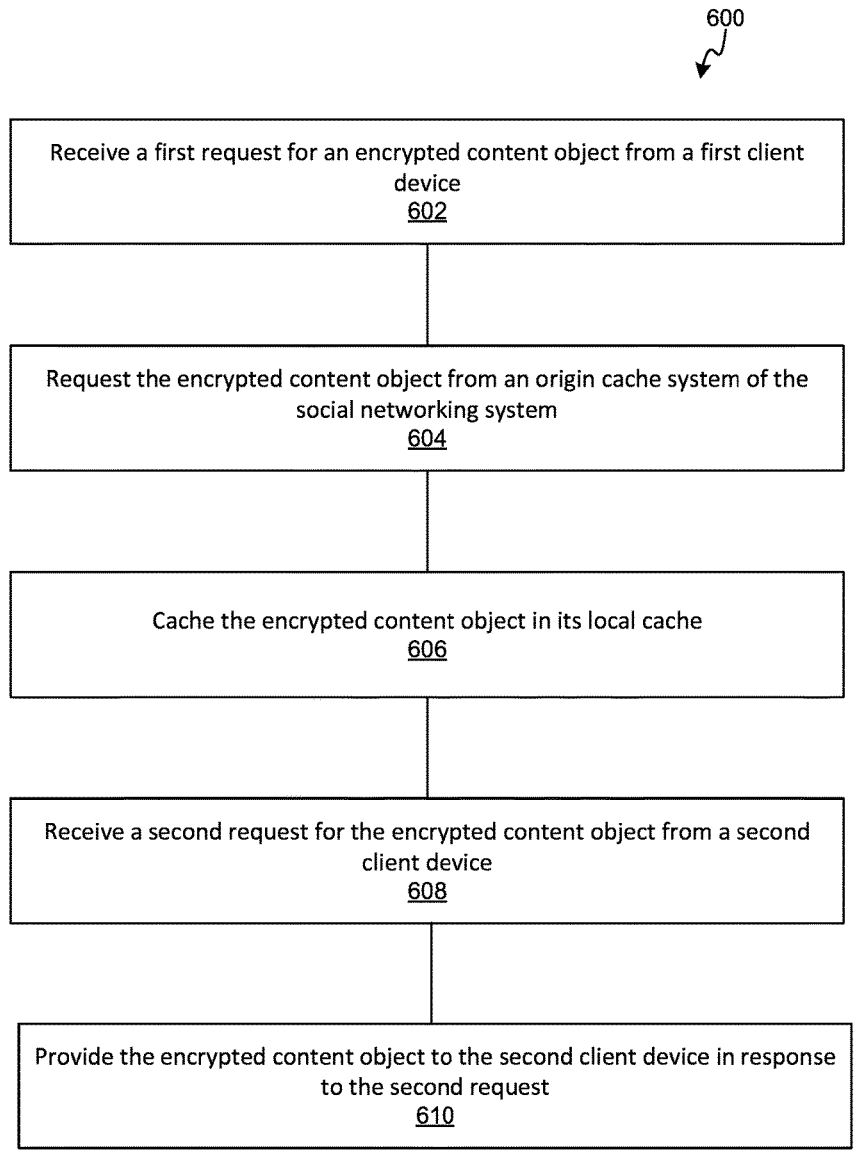
FIG. 6 is a flow diagram illustrating a method of operating a CDN to implement a secure content distribution mechanism, in accordance with various embodiments.

FIG. 6 is a flow diagram illustrating a method 600 of operating a CDN to implement a secure content distribution mechanism, in accordance with various embodiments. In block 602, the CDN can receive a first request for an encrypted content object from a first client device. The content object can be associated with a social networking system. In response to determining that the encrypted content object is unavailable in a local cache of the CDN, in block 604, the CDN can request the encrypted content object from an origin cache system of the social networking system. In various embodiments, the CDN does not have access to a decryption key to decrypt the encrypted content object.

In block 606, the CDN can cache the encrypted content object in its local cache. In block 608, the CDN can receive a second request for the encrypted content object from a second client device. In block 610, the CDN can provide the encrypted content object to the second client device in response to the second request.

Figure 7:
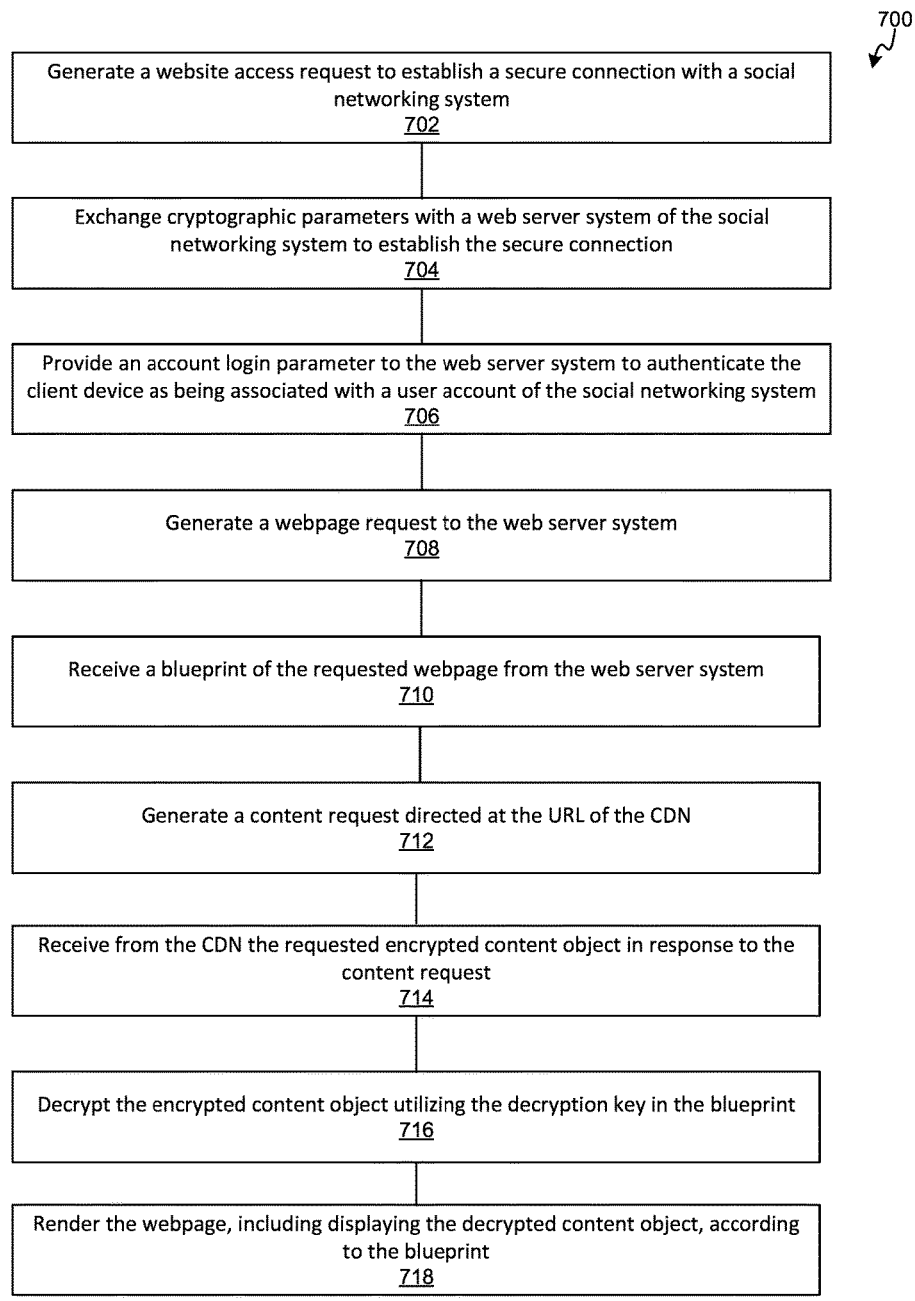
FIG. 7 is a flow diagram illustrating a method of operating a client device requesting a webpage, in accordance with various embodiments.

FIG. 7 is a flow diagram illustrating a method 700 of operating a client device requesting a webpage, in accordance with various embodiments. The client device can be one of the client devices 104. In block 702, the client device can generate a website access request to establish a secure connection with a social networking system. For example, the client device can specify a website URL in the website access request. The client device can obtain the network address of a web server system of the social networking system from a DNS server system. In block 704, the client device can exchange cryptographic parameters with a web server system of the social networking system to establish the secure connection. In block 706, the client device can provide an account login parameter to the web server system to authenticate the client device as being associated with a user account of the social networking system.

In block 708, the client device can generate a webpage request to the web server system. In response, the client device can receive, in block 710, a blueprint of the requested webpage from the web server system. The blueprint can include markup language describing a presentation format of the webpage. The blueprint can include a URL for at least an encrypted content object from a CDN. The URL can include a host name of the CDN and a content object link to the encrypted content object. The blueprint can also include a decryption key to decrypt the content object from the CDN.

In block 712, the client device can generate a content request directed at the URL of the CDN. In block 714, the client device can receive from the CDN the requested encrypted content object in response to the content request. In block 716, the client device can decrypt the encrypted content object utilizing the decryption key in the blueprint. In some embodiments, the blueprint from the web server system includes a client-side script package (e.g., JavaScript cryptography library) that enables the client device to perform cryptographic operations (e.g., decryption). In these embodiments, the client device decrypts the encrypted content object utilizing logical instructions from the client-side script package and/or a web browser application built-in cryptography module. In block 718, the client device can then render the webpage, including displaying the decrypted content object, according to the blueprint.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 8:
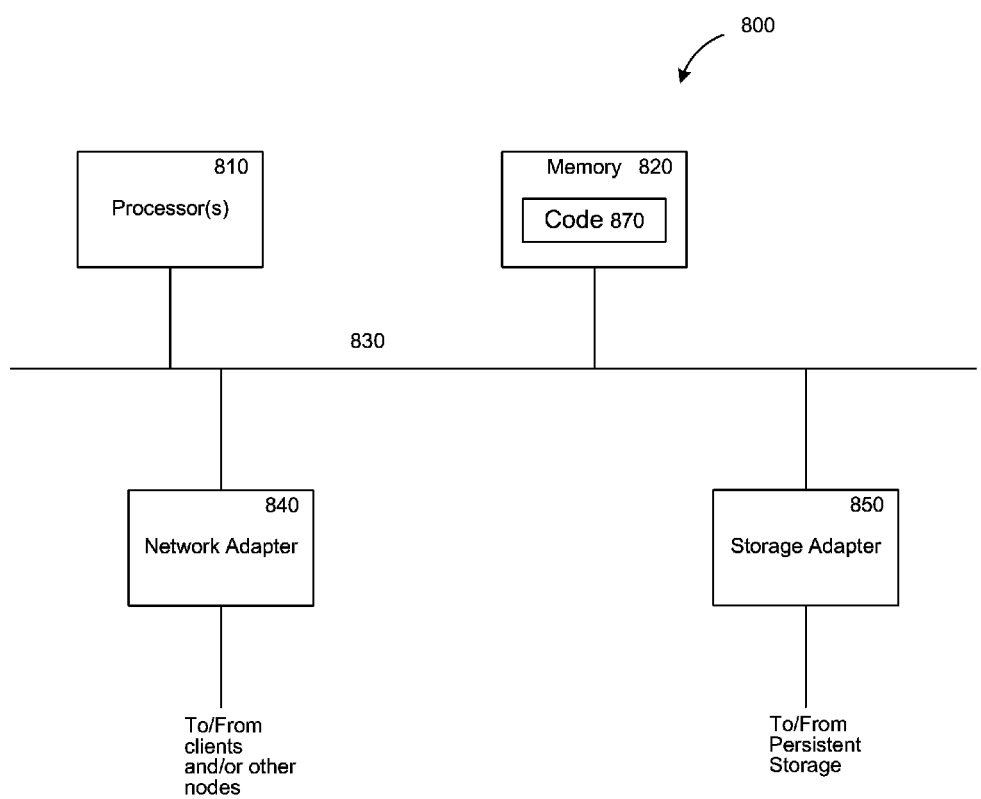
FIG. 8 is a block diagram illustrating an example of a computing device in or coupled to a social networking system, in accordance with various embodiments.

FIG. 8 is a block diagram illustrating an example of a computing device 800 in or coupled to a social networking system (e.g., the social networking system 100, the social networking system 200, and/or the origin cache system 300), in accordance with various embodiments. In some embodiments, other computing devices (e.g., the CDN 102, the client devices 104, the DNS system 106, or any combination thereof) in the network environment illustrated in FIG. 1 can also be implemented as one or more instances of the computing device 800. For example, the computing device 800 can represent one or more computing devices in the social networking system 100, and/or methods and processes described in this disclosure. The computing device 800 includes one or more processors 810 and memory 820 coupled to an interconnect 830. The interconnect 830 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions according to the systems or methods disclosed herein.

Also connected to the processor(s) 810 through the interconnect 830 are a network adapter 840 and a storage adapter 850. The network adapter 840 provides the computing device 800 with the ability to communicate with remote devices (e.g., amongst devices, components, and/or systems described in this disclosure), over a network and may be, for example, an Ethernet adapter or Fibre Channel adapter. The network adapter 840 may also provide the computing device 800 with the ability to communicate with other computers. The storage adapter 850 enables the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A computer-implemented method, comprising:
    generating, at a social networking system, an encryption key for a content object in the social networking system;
    associating, at the social networking system, a decryption key, corresponding to the encryption key, with a content object link for the content object;
    encrypting, at the social networking system, the content object with the encryption key;
    transmitting, from the social networking system, the encrypted content object to a remote untrusted content delivery network (CDN);
    establishing, by the social networking system, a secure channel session with a client device;
    receiving, at the social networking system from the client device, a request for a page to render on the client device; and
    transmitting, in response to the request from the social networking system via the secure channel session, a blueprint of the page, a uniform resource locator (URL) to the encrypted content object in the remote untrusted CDN, and the decryption key to the client device, wherein the client device;
    uses the URL to request the encrypted content object from the remote untrusted CDN;
    uses the decryption key to decrypt the encrypted content object; and
    uses the blueprint to render the page at the client device.

2. The computer-implemented method of claim 1, wherein the URL includes the content object link and a hostname of the remote untrusted CDN.

3. The computer-implemented method of claim 1, further comprising:
    receiving a content file as the content object; and
    tracking the content object in the social networking system including tracking one or more object attributes associated with the content file.

4. The computer-implemented method of claim 1, further comprising:
    receiving a resource package of one or more client-side executables or scripts from a developer account; and tracking the content object in the social networking system including tracking one or more object attributes associated with the resource package.

5. The computer-implemented method of claim 1, further comprising authenticating a login parameter provided by the client device to verify a user account of the social networking system associated with the client device prior to transmitting the blueprint.

6. The computer-implemented method of claim 1, wherein establishing the secure channel session includes establishing a first secure session between the social networking system and an edge proxy and establishing a second secure session between the edge proxy and the client device.

7. The computer-implemented method of claim 1, wherein the remote untrusted CDN is managed by a third-party entity that is different from an entity managing the social networking system.

8. The computer-implemented method of claim 1, wherein:
transmitting the blueprint of the page is in response to receiving a page request from the client device after establishing the secure channel session;
the computer-implemented method further comprises dynamically generating the page in response to the page request based on a current state of a social graph of the social networking system; and
dynamically generating the page includes dynamically determining that the content object will be included in the page.

9. The computer-implemented method of claim 1, further comprising generating the encryption key and the decryption key in response to creating the content object in the social networking system.

10. The computer-implemented method of claim 1, wherein the encryption key is the decryption key.

11. The computer-implemented method of claim 1, wherein:
the encryption key and the decryption key are object-specific; and
transmitting the decryption key includes transmitting a key dictionary storing one or more decryption keys corresponding to one or more content object links provided in the blueprint, the content object links respectively corresponding to encrypted content objects in the remote untrusted CDN.

12. The computer-implemented method of claim 1, further comprising:
generating the content object link associated with the encrypted content object in the remote untrusted CDN by hashing a content object identifier, used to track the content object in a social graph of the social networking system, according to a hash function; and
storing a hash key used for said hashing as an object attribute of the content object in a cache system.

13. The computer-implemented method of claim 1, further comprising generating a key dictionary, wherein said generating includes accessing a content store to identify one or more decryption keys and one or more content object links that correspond to one or more encrypted content objects to include in the page according to the blueprint.

14. The computer-implemented method of claim 1, further comprising:
changing the encryption key to a new encryption key according to a deterministic schedule;
identifying a new decryption key corresponding to the new encryption key; and
storing the new encryption key, the new decryption key, or both as content attributes of the content object.

15. A computer server, comprising:
a processor;
a memory system configured to store executable instructions; and
a content cache store configured to store data,
wherein the processor, when configured by the executable instructions, is operable to:
receive, at a social networking system, a content object associated with a content object link from the social networking system;
store, at the social networking system, the content object in the content cache store;
receive, at the social networking system, a content request specifying the content object link to the content object, wherein the content request is from a remote untrusted content delivery network (CDN);
in response to the content request, encrypt, at the social networking system, the content object utilizing an encryption key associated with the content object in the content cache store;
associate, at the social networking system, a decryption key, corresponding to the encryption key, with a content object link for the content object;
transmit, from the social networking system to the remote untrusted CDN, a response message for the content request, wherein the response message includes the encrypted content object;
establish, by the social networking system, a secure channel session with a client device;
receive, at the social networking system from the client device, a request for a page to render on the client device; and
transmit, in response to the request for the page from the social networking system via the secure channel session, a blueprint of the page, a uniform resource locator (URL) to the encrypted content object in the remote untrusted CDN, and the decryption key to the client device, wherein the client device:
uses the URL to request the encrypted content object from the remote untrusted CDN;
uses the decryption key to decrypt the encrypted content object; and
uses the blueprint to render the page at the client device.

16. The computer server of claim 15, wherein the processor, when configured by the executable instructions, is further operable to transcode the content object for streaming, wherein said encrypting of the content object utilizes a streaming encryption algorithm.

17. The computer server of claim 15, wherein the processor, when configured by the executable instructions, is further operable to decipher the content object link to compute an original content object identifier associated with the content object in the content cache store and to retrieve the content object for encrypting utilizing the original content object identifier.

18. A non-transitory computer readable data memory storing computer-executable instructions that, when executed by a computer system, cause the computer system to perform a computer-implemented method, the computer-executable instructions comprising:
instructions for generating, by a client device, a website access request to establish a secure connection with a social networking system for a webpage of a website associated with the social networking system;

instructions for receiving, at the client device, a blueprint of the webpage from the social networking system, wherein the blueprint includes markup language describing a presentation format of the webpage and a uniform resource locator (URL) for at least a content object in an untrusted content delivery network (CDN), wherein:

the untrusted CDN is managed by a third-party entity that is different from an entity managing the social networking system; and the markup language includes a decryption key associated with the URL for the content object;

instructions for generating, by the client device, a content request directed at the URL of the untrusted CDN;

instructions for receiving, from the untrusted CDN and at the client device, an encrypted content object in response to the content request;

instructions for decrypting, by the client device, the encrypted content object utilizing the decryption key received from the social networking system; and instruction for using the blueprint to render the webpage at the client device.

19. The non-transitory computer readable data memory of claim 18, wherein the computer-executable instructions further comprises instructions for presenting the decrypted content object according to the blueprint.

20. The non-transitory computer readable data memory of claim 18, wherein the computer-executable instructions further comprises instructions for receiving browser executable or script as part of the blueprint to decrypt the encrypted content object;

and instructions for utilizing the browser executable or script to decrypt the encrypted content object.

* * * * *